US011865693B2

(12) United States Patent
Phelps

(10) Patent No.: US 11,865,693 B2
(45) Date of Patent: Jan. 9, 2024

(54) ALIGNMENT ATTACHMENT FOR SCREW GUN

(71) Applicant: William Phelps, Cato, NY (US)

(72) Inventor: William Phelps, Cato, NY (US)

( * ) Notice: Subject to any disclaimer, the term of this patent is extended or adjusted under 35 U.S.C. 154(b) by 0 days.

(21) Appl. No.: 17/517,344

(22) Filed: Nov. 2, 2021

(65) Prior Publication Data

US 2023/0136712 A1 May 4, 2023

(51) Int. Cl.
*B25H 1/00* (2006.01)
*B25C 7/00* (2006.01)

(52) U.S. Cl.
CPC ............. *B25H 1/0078* (2013.01); *B25C 7/00* (2013.01); *B25H 1/0057* (2013.01)

(58) Field of Classification Search
CPC ........ B25H 1/0078; B25H 1/0057; B25C 7/00
See application file for complete search history.

(56) References Cited

U.S. PATENT DOCUMENTS 2,430,812 A * 11/1947 Goldberg .............. B23B 49/006 408/112
2,831,376 A * 4/1958 Daniels ................ B25H 1/0078 408/112
2,909,085 A * 10/1959 Jepson ................. B25H 1/0078 408/112
2,978,931 A * 4/1961 Broden ................. B23B 49/006 408/113
2,997,900 A * 8/1961 Pugsley ............... B25H 1/0021 408/112
3,125,761 A * 3/1964 Adams .................... E04D 15/04 227/151
3,242,773 A * 3/1966 Van Praag ........... B25H 1/0078 408/112
3,537,336 A * 11/1970 Schmuck .............. B23B 49/006 408/72 R
3,707,043 A * 12/1972 Jones ................... B25H 1/0092 408/112
3,746,460 A * 7/1973 Lipe ..................... B25H 1/0078 408/112
3,779,663 A * 12/1973 Ruggles ............... B25H 1/0078 408/202

(Continued)

FOREIGN PATENT DOCUMENTS

DE 20109843 U1 10/2001
EP 0347403 B1 5/1991

(Continued)

*Primary Examiner* — Thomas M Wittenschlaeger
*Assistant Examiner* — Katie L Gerth
(74) *Attorney, Agent, or Firm* — Bernhard P. Molldrem, Jr.

(57) ABSTRACT

A tool that mounts on a power driver or other tool for installing framing members in a building ensures proper and uniform spacing of the framing members. A support that may be a C-shaped band clamp removably attaches to the power tool. A generally tubular gauge body snap-attaches in place and a slide member disposed within the gauge body is adjustable to extend a sufficient amount so the combined length of the tubular gauge body and the extended slide member provide a proper spacing for the framing members. A slide lock for holds the slide member at the extended position. This allows the measuring and installation to be done without the installer having to set the power tool down or use a ruler or tape measure once the spacing is established.

12 Claims, 9 Drawing Sheets

(56) References Cited

U.S. PATENT DOCUMENTS

| | | | | | |
|---|---|---|---|---|---|
| 3,979,165 | A * | 9/1976 | Pyle | B25H 1/0078 | 408/110 |
| 4,072,440 | A * | 2/1978 | Glover | B25H 1/0078 | 408/112 |
| 4,113,404 | A * | 9/1978 | Lippacher | B23B 49/006 | 408/202 |
| 4,250,971 | A * | 2/1981 | Reibetanz | B23B 49/006 | 173/21 |
| 4,281,949 | A * | 8/1981 | Bugarin | B25H 1/0085 | 408/112 |
| 4,314,782 | A * | 2/1982 | Beekenkamp | B25H 1/0078 | D15/138 |
| 4,820,090 | A * | 4/1989 | Chen | B25F 5/027 | 81/177.4 |
| 5,147,162 | A * | 9/1992 | Capotosto | B25H 1/0078 | 408/110 |
| 5,152,644 | A * | 10/1992 | Mathews | B23C 1/20 | 409/181 |
| 5,449,317 | A * | 9/1995 | Takessian | B24B 23/02 | 451/457 |
| 5,465,492 | A * | 11/1995 | Bond | B25F 5/003 | 33/275 R |
| 5,539,994 | A * | 7/1996 | Milden | G01B 3/1084 | 33/286 |
| 5,690,451 | A * | 11/1997 | Thurler | B25F 5/003 | 408/113 |
| 5,807,035 | A * | 9/1998 | Lewin | B23Q 3/069 | 408/95 |
| 5,899,644 | A * | 5/1999 | Buck | B28D 7/00 | 408/97 |
| 6,119,912 | A * | 9/2000 | Peck | B25C 7/00 | 227/120 |
| 6,609,860 | B2 * | 8/2003 | Wanek | B25F 5/026 | 408/113 |
| 6,692,201 | B2 * | 2/2004 | Soderman | B25H 1/0064 | 408/712 |
| 6,887,146 | B2 * | 5/2005 | Staas | B23Q 11/0046 | 408/67 |
| 7,144,206 | B2 * | 12/2006 | Burger | B25F 5/003 | 408/14 |
| 7,617,885 | B2 * | 11/2009 | Howland | B25F 5/00 | 173/171 |
| 7,946,049 | B1 * | 5/2011 | Wilton | G01B 3/30 | 33/526 |
| 8,047,100 | B2 * | 11/2011 | King | B25F 5/021 | 81/57.37 |
| 8,365,419 | B2 * | 2/2013 | Bernardi | B23B 49/003 | 30/392 |
| 8,375,541 | B1 * | 2/2013 | Beachy | B23B 47/287 | 408/110 |
| 9,149,923 | B2 * | 10/2015 | Campbell | B25F 5/003 | |
| 9,248,562 | B2 * | 2/2016 | Bernardi | B23B 49/003 | |
| 9,956,659 | B2 * | 5/2018 | Takeuchi | B23Q 11/0046 | |
| 10,183,339 | B2 * | 1/2019 | Li | B23B 49/005 | |
| 10,549,416 | B2 * | 2/2020 | Fiala | B25C 7/00 | |
| 11,077,533 | B2 * | 8/2021 | Limberg | B25F 5/02 | |
| 2005/0005470 | A1 * | 1/2005 | Snider | B25F 5/02 | 33/760 |
| 2011/0131766 | A1 * | 6/2011 | Imaschewski | B25F 5/026 | 16/426 |
| 2013/0161361 | A1 * | 6/2013 | Szpak | B26D 3/169 | 222/391 |

FOREIGN PATENT DOCUMENTS

| | | | |
|---|---|---|---|
| WO | WO-02-070832 | A1 | 9/2002 |
| WO | 2004/071716 | A1 | 8/2004 |

* cited by examiner

ALIGNMENT ATTACHMENT FOR SCREW GUN

This invention is directed toward tools for accurately setting the placement of workpiece members such as supports and framing members for installation of walls and ceilings. This tool may be removably mounted on another device, such as an electric drill or power driver used in connection with installation of steel framing strips for ceiling drywall. The tool of this invention may be embodied in a three-part attachment for a power driver, e.g., power drill or screw gun, for use when installing parallel elongated strips, such as the metal strips, and when positioning the metal strips parallel to one another on the ceiling joists at a predetermined spacing. This tool also facilitates installation around obstacles such as a ceiling light electrical box.

The invention more particularly concerns a three-part tool in which one part clamps onto a power tool, e.g., screw gun, power nailer, or similar, and has snap-in clamping capability for holding the adjustable length portion. Favorably, a swing-out wire probe is placed at one end of the two-part spacing portion.

In a described embodiment, there is a clamp portion “A” that attaches to the body of the screw gun, and this has a pair of cut flex rings for holding an outer tubular member “B” in which a smaller-diameter inner tubular slide member “C” slides in and out and can be held or clamped in position.

The clamp’s part A can be of any of a number of configurations so as to be held securely in place on the drill or screw gun (or other device or tool).

The part B is configured to snap into and out of the clamp portion A. The B part has a swing-out pin at a front end to help in locating the device in a previously installed framing strip. The C part is adjusted in the B part so that the distance from one end to the other of B and C is adjustable to a nominal 12 or 16 inches. The spacing may be outside these settings, although 12 inch and 16 inch spacings are standard.

The spacing tool of this invention may be installed or clamped on the screw gun or other device. The combination places the properly calibrated spacing device right on the screw gun, and avoids having to use a tape rule and pencil to mark the position for the framing strips. A metal device on the back end of the tubular member C helps stabilize the whole attachment while spacing the framing members. This speeds the installation of the framing members, and also ensures that the spacing is everywhere proper.

SUMMARY OF THE INVENTION

A practical solution according to the main principles of this invention is disclosed and illustrated herein. The alignment tool is designed to ensure proper and uniform spacing of framing members in a building structure during installation, and permits the installer to place the framing accurately without having to set the power driver down during installation and without having to use a ruler or tape measure to set the location of each framing piece.

This tool includes a bracket that removably attaches to the power tool. A pair of snap-in clamp devices are mounted on the bracket. A generally tubular gauge body is configured to snap-attach into place in the clamp device or devices. The gauge body has a slide member that is slidably disposed within the tubular gauge body and is extendible for a sufficient distance so that the combined length of the tubular gauge body and the extended portion of the slide member at a given length corresponds to the proper spacing of the framing members. Favorably, the slide can be locked in place at that spacing distance. That may involve a slide lock for holding the slide member at that setting.

In a favorable embodiment, the bracket is C-shaped and is adapted for securing to a case or shell of a power driver, which may have channels or indentations on its sides. A support member that supports the snap-in clamps may include an elongated planar member that is affixed onto the bracket, with the pair of snap-in clamp devices affixed to respective ends of the elongated planar member.

The gauge body can be in the form of an elongated tube within which the slide member can travel for at least a limited distance. A clamp at a proximal end of the elongated tube can permit travel of the slide member but can close against the slide member and block its travel when in a closed condition. The slide member may have a stop member e.g. a right angle piece, at a proximal end thereof adapted for seating against a framing member when placing the same in relation to existing installed work. The right angle member can have a pair of teeth that project proximally.

The gauge body member of this invention can include a swing-out probe member pivotally attached to its distal end. The swing-out probe member can be a stiff wire member or other rigid finger pivotally mounted on a collar located at the distal end of the gauge body member.

While the framing tool of this invention can be used with any of a number of power installation devices, including power nailers, power screw drivers, and the like, the described example tool according to this invention is used on a power driver or screw gun that has a rotary spindle extending distally from its main body with a strut extending downward from the elongated planar member, and a spindle collar affixed at a lower end of the strut and adapted to fit over the spindle. In that case, where the power driver has a casing with recesses on left and right sides, the C-shaped bracket has left and right fastener members positioned at respective ends, and these can be extended toward one another to engage the casing within the respective left and right recesses.

The foregoing and other features and advantages of this invention will become apparent from the following detailed description of a preferred embodiment, described in connection with the following Drawing figures.

DETAILED DESCRIPTION OF A PREFERRED EMBODIMENT

Figure 1:
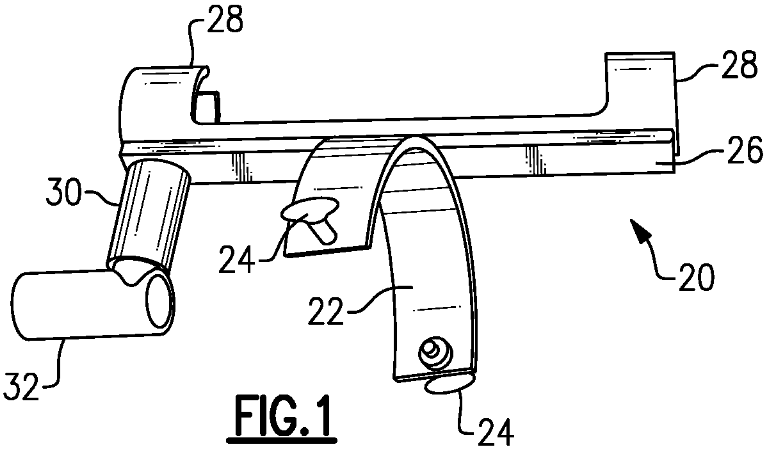
FIGS. 1 to 3 are perspective views of the support member, tubular or cylindrical gauge body, and slide member, respectively; these together form the framing tool of an embodiment of this invention.

With initial reference to FIGS. 1 to 5 of the Drawing, a preferred embodiment of the framing installation or spacing tool 18 of this invention is shown being composed of three separate parts (FIGS. 1, 2, and 3), which fit together to mount upon a power driver 10 or screw gun (FIGS. 6-8) of the type having a pistol-grip body 12, with a chuck 14, spindle 16 and driver bit 17 that extend distally (here, to the left) from the body of the screw gun.

The spacing tool 18 includes a support member 20 as shown in FIG. 1 which has a body clamp 22, here in the form of C-shaped rigid hemispherical band, with thumb screws or wing nuts 24 at each end and which extend toward one another. An elongated generally planar bar 26 is affixed onto the clamp 22, and at proximal and distal ends of the bar there are C-shaped spring clamps 28 for the front and back ends of the spacing gauge to be described shortly. Also shown at the distal end of the bar 26 is a strut 30 that descends form the bar, and at the lower end of the strut 30 a spindle collar 32 is positioned to fit over the spindle 16 in a loose fit over the spindle 16.

Figure 2:
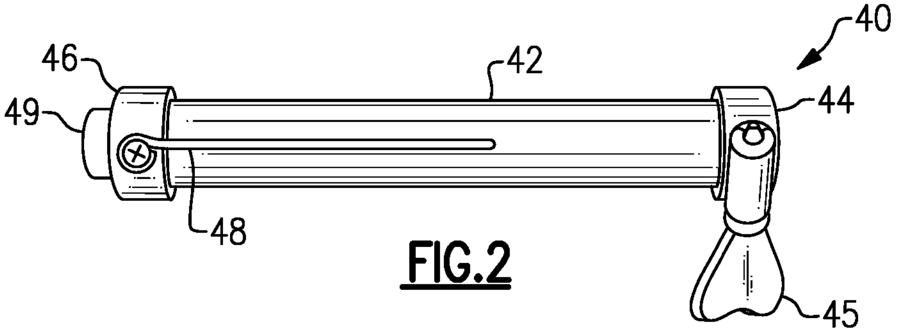
Figure 3:
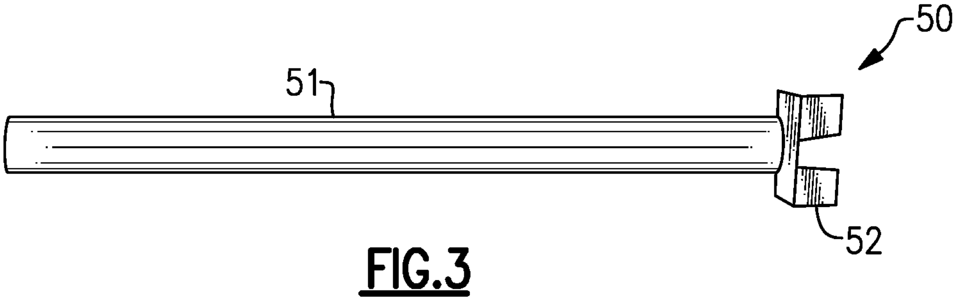

As shown in FIG. 2 a spacing gauge 40 is made up of a gauge body or barrel 42 in combination with a slide 50 (FIG. 3). The barrel is hollow so that the slide 51 can fit inside and move proximal-distally. The gauge body 42 is dimensioned to snap-fit into the spring clamps 28 of FIG. 1, and has a ring clamp 44 with an associated thumb screw 45 at its proximal (here, right) end. A collar 46 is located at the distal end of the gauge body and a swing-out probe or wire finger 48 is pivotally mounted on the collar. An end bumper 49 is also located on the distal end of the gauge body.

The slide 50 is formed of an elongated straight rod 51 (or tube or other elongate stiff member), and a stop member 52 is located at the proximal end of the rod 51 in the form of a right angle piece. This is provided to engage an edge of the framing member (not shown) to be spaced and installed. In this embodiment, the stop member 52 has two axial teeth spaced from one another, but the stop member could have any of a variety of configurations, depending upon the dimensions and material of the workpiece.

Figure 4:
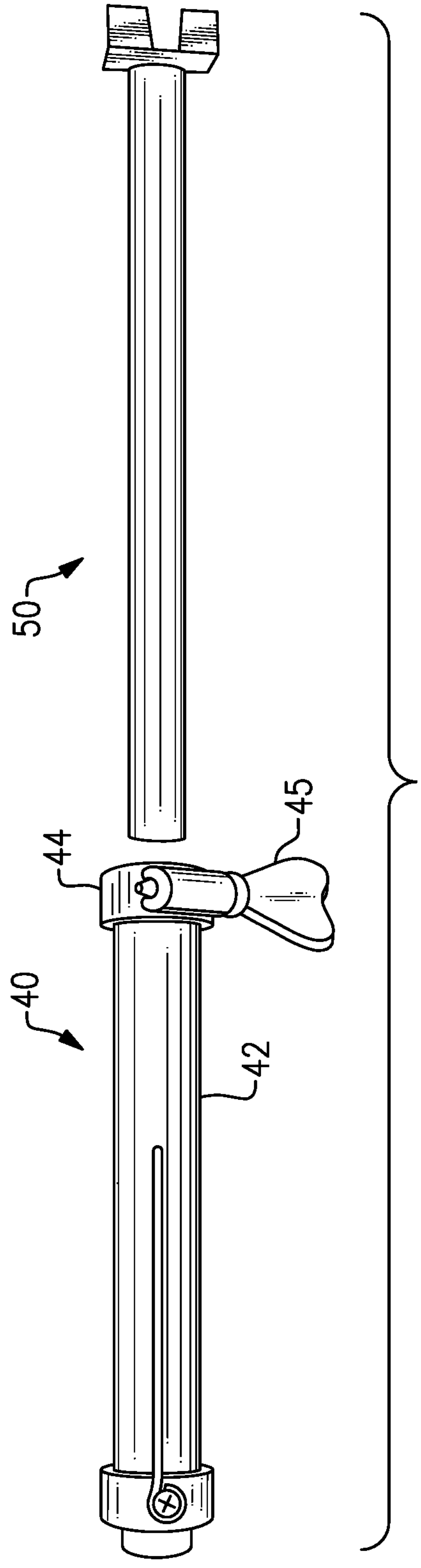
FIGS. 4 and 5 illustrate the gauge body and slide member as individual elements and combined with the slide member extending partly from the gauge body, respectively.
Figure 5:
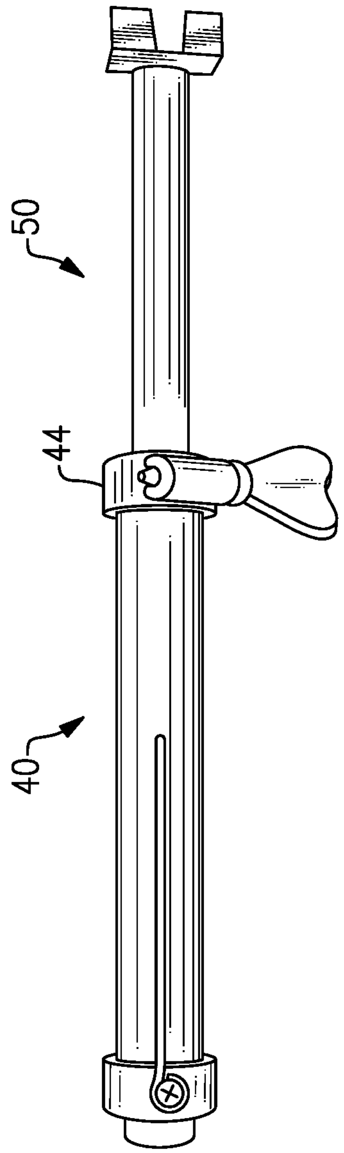
Figure 6:
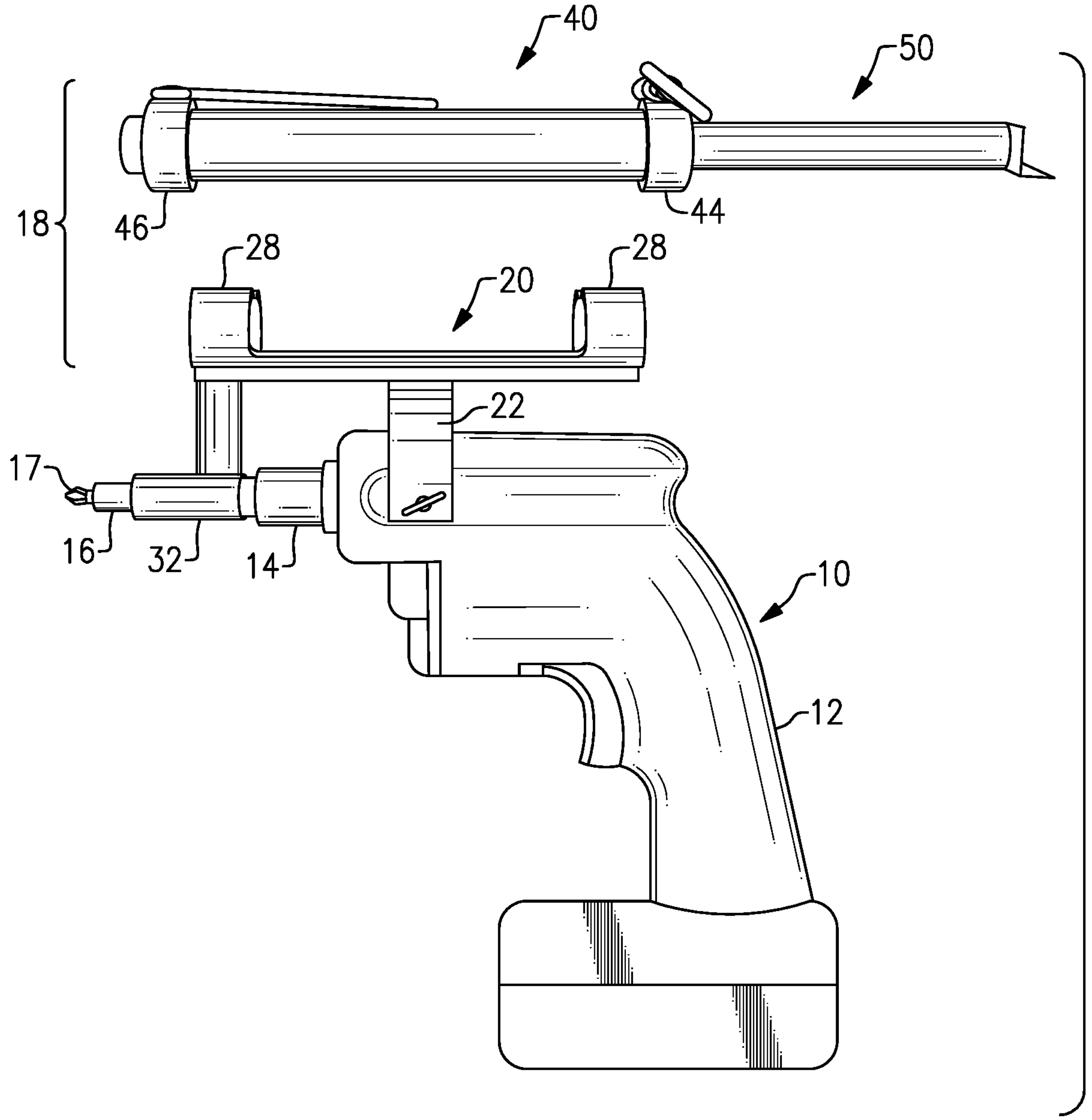
FIG. 6 is a side view of the framing tool of this invention mounted onto one type of screw gun, and with its gauge body and slide not yet installed into the snap-in clamps on the support member.

As shown in FIG. 4 and FIG. 5, the slide or slide rod 50 may be inserted into the proximal end of the barrel or gauge body 42 and its position may be adjusted to match the spacing of the framing members. This position may be locked by turning the thumb screw 45. Once the length of the assembled spacing gauge 40 is set, it can be snapped into place in the spring clamps 28 of the support member 20. In this case, as shown in FIG. 6, the clamp 28 mounts onto the body or casing of the power driver 10. The thumbscrews or wing nuts engage respective recesses along each side of the housing of the power driver. As shown in FIG. 6 and following drawing figures, the spindle collar 32 portion of the spacing attachment fits over the spindle 16 of the power driver to ensure correct alignment and positioning of the attachment on the power driver.

Figure 7:
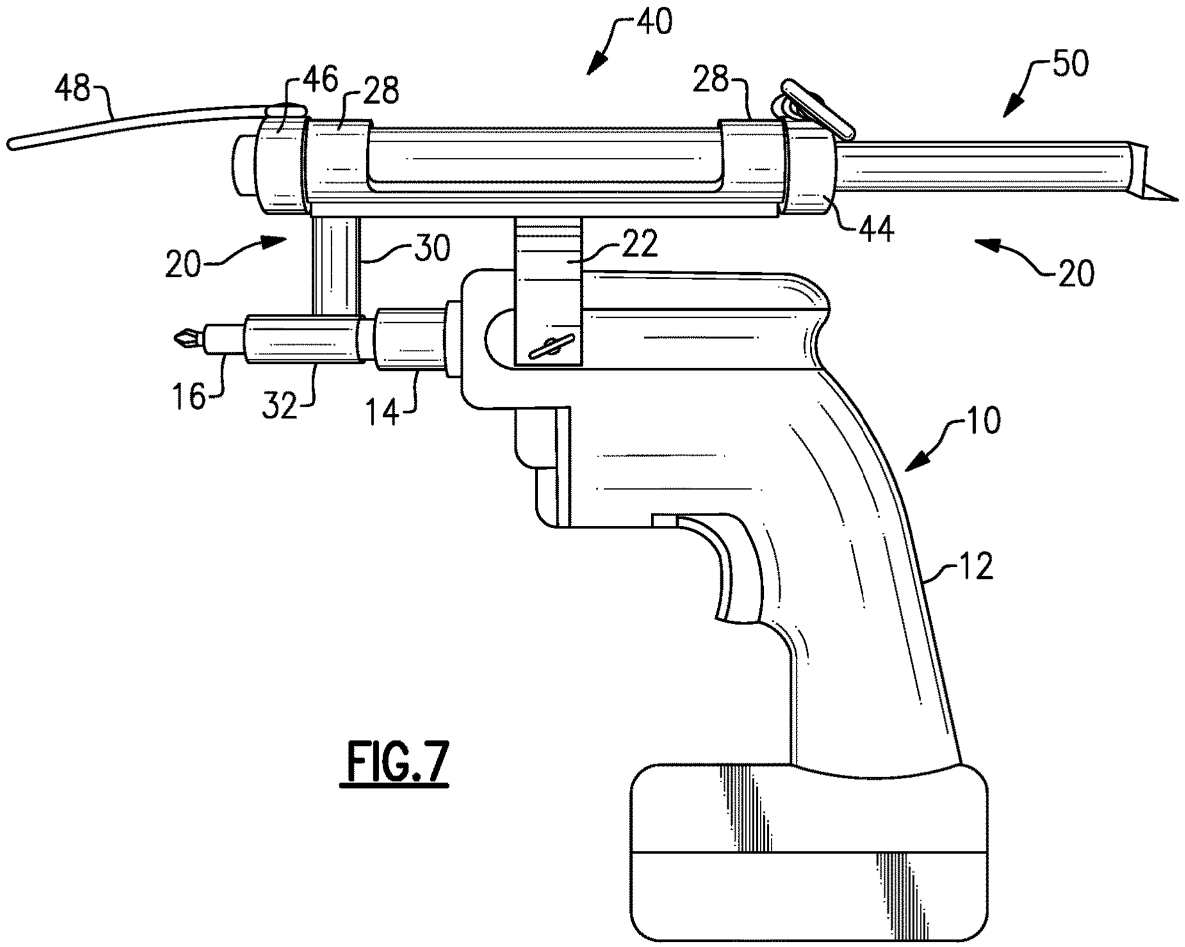
FIGS. 7 and 8 are side views showing the guide ember installed onto the support member, with the swing-out probe member in an extended position (FIG. 7) and in a withdrawn or swung-back position (FIG. 8).
Figure 8:
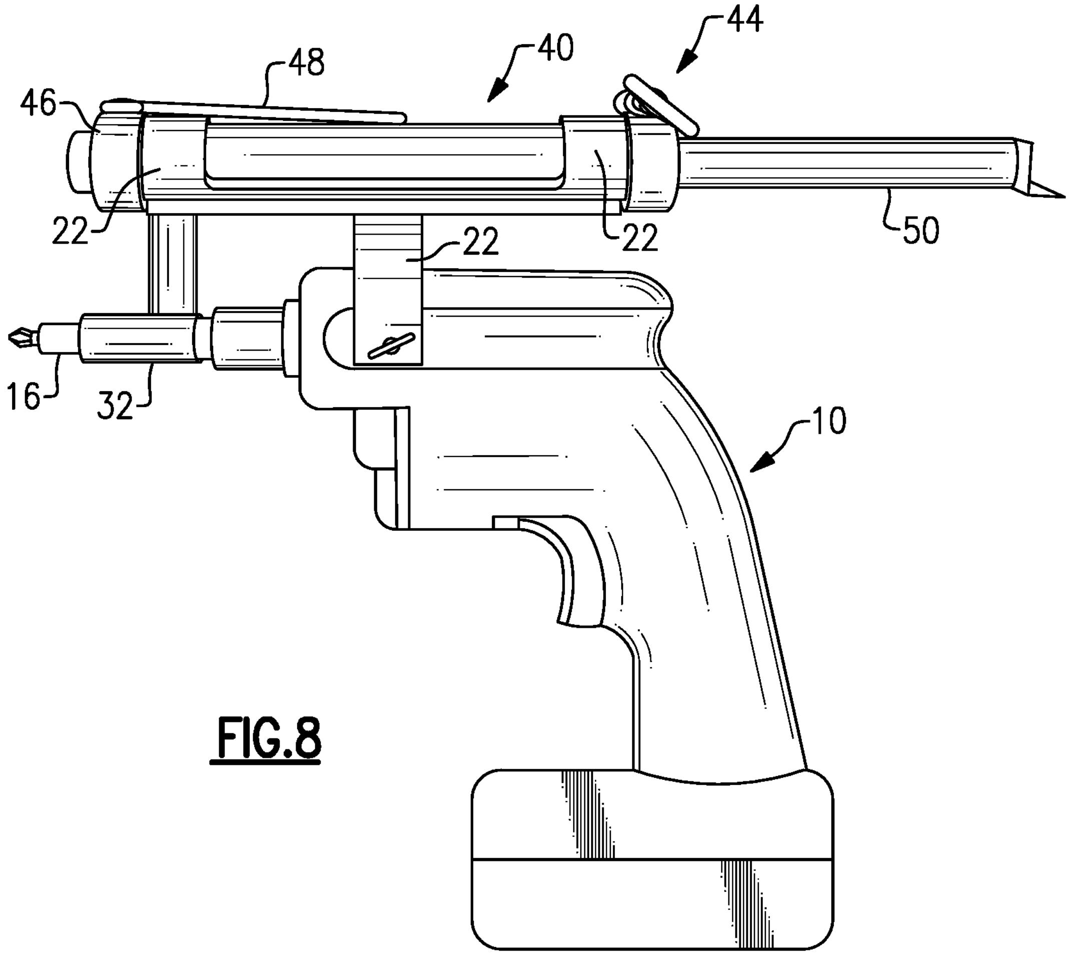

FIG. 7 shows the power driver and attachment combination as in FIG. 6, but with the gauge body 42 positioned and mounted on the support member 20 and held in the spring clamps 28. The swing-out wire finger 48 is positioned to extend distally to assist in alignment and positioning of the power driver bit or screw head on components of the framing being installed. FIG. 8 shows the power driver and attachment as in FIG. 7, but with the finger 48 swung back or retracted and positioned along the top of the gauge body 42.

Figure 9:
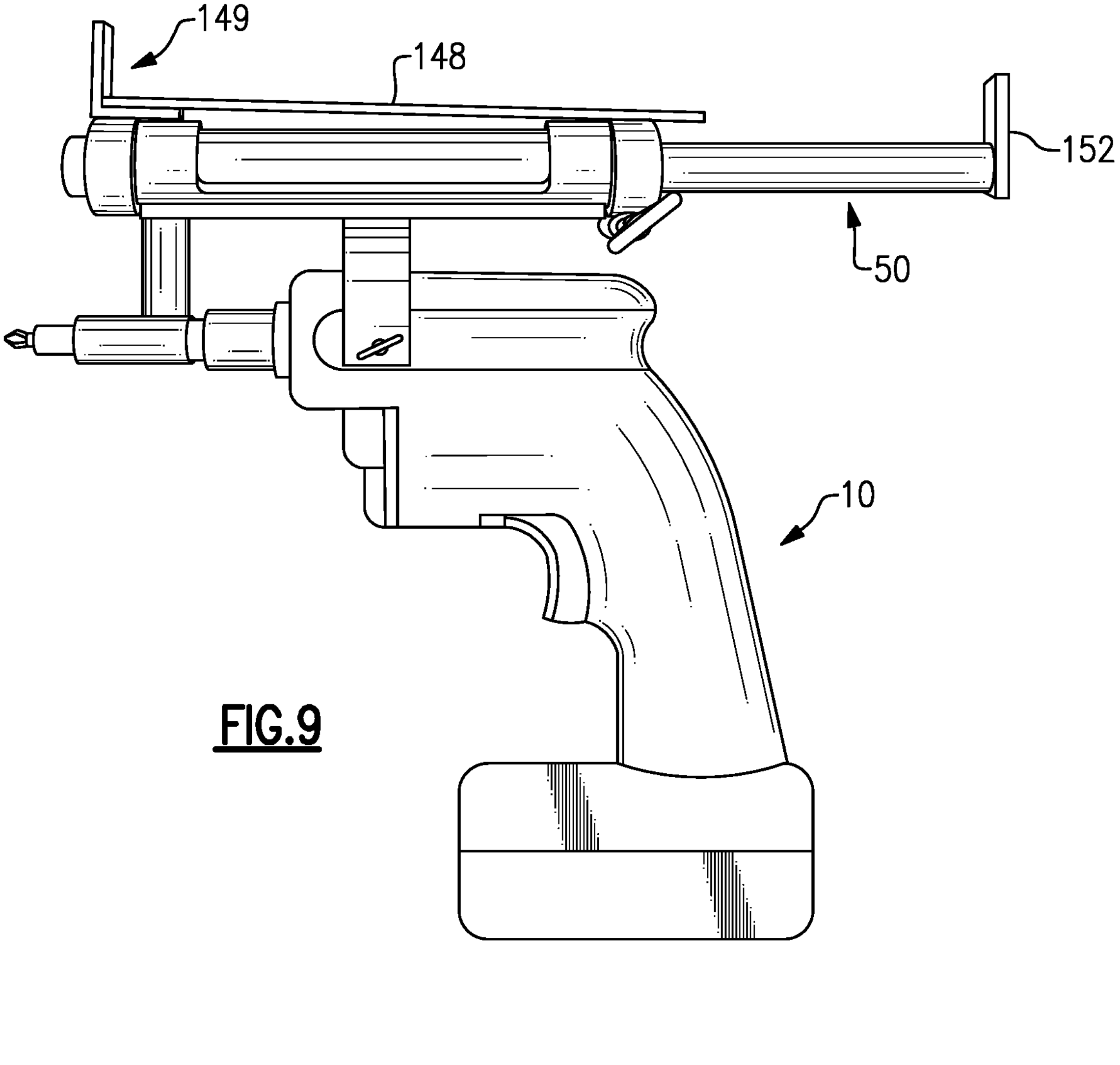
FIG. 9 is a side view illustrating an alternative embodiment.

FIG. 9 shows a similar arrangement where the parts and elements correspond to those in FIGS. 1 to 8, except that the wire finger 48 has been replaced with a finger member 148 that is affixed to a pivotable L-shaped flange member 149 so that a flat vertical surface is presented at the distal end of the gauge body when the finger member is in its swung-back or retracted position. The finger member 148 may be a wire finger or a flat, elongated plate or flange. Also a right-angle flat plate member 152 is positioned at the proximal end of the rod or slide 50 in this embodiment.

Figure 10:
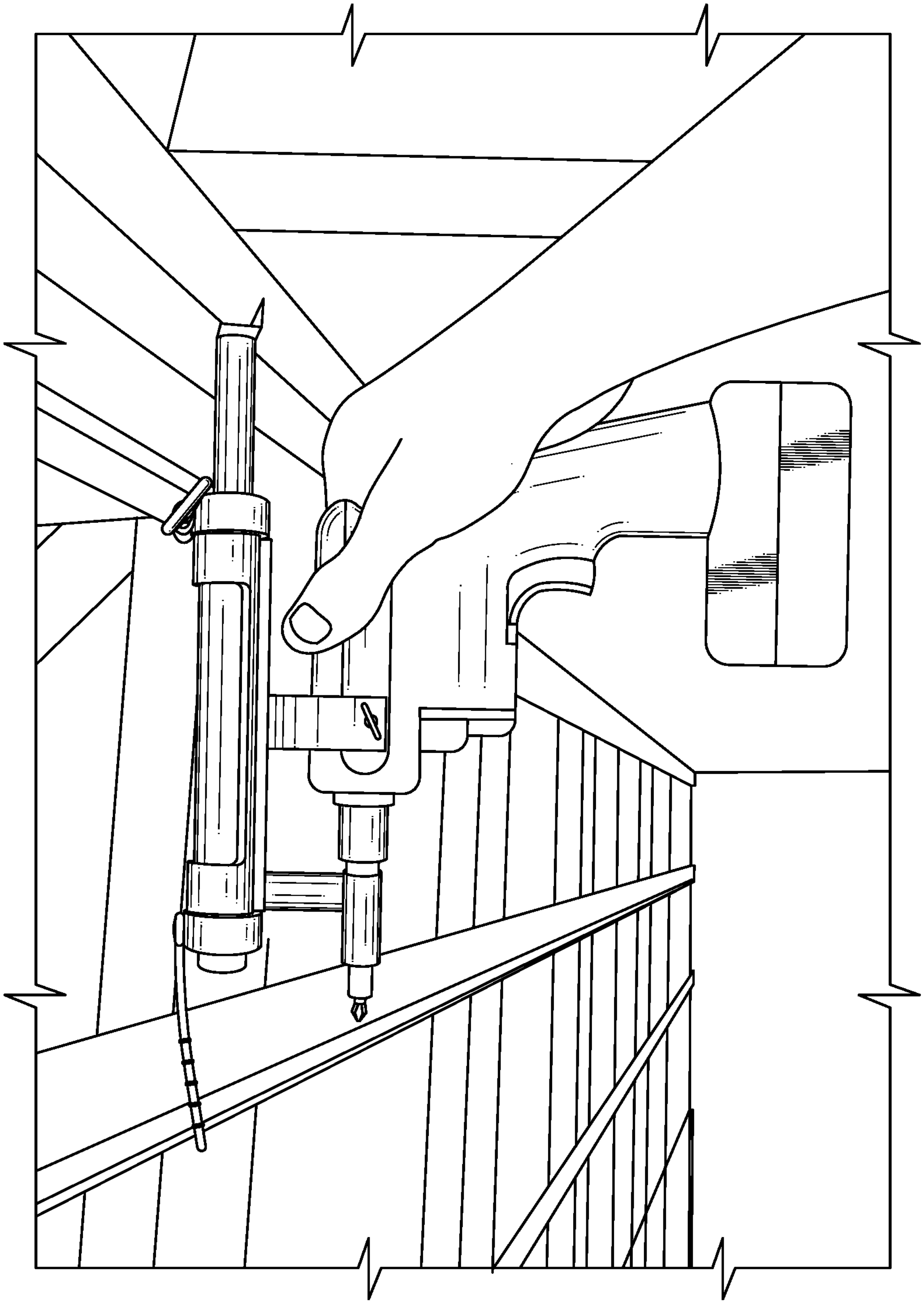
FIGS. 10, 11, and 12 illustrate practical applications of the installation and framing tool of this invention, shown during framing installations.
Figure 11:
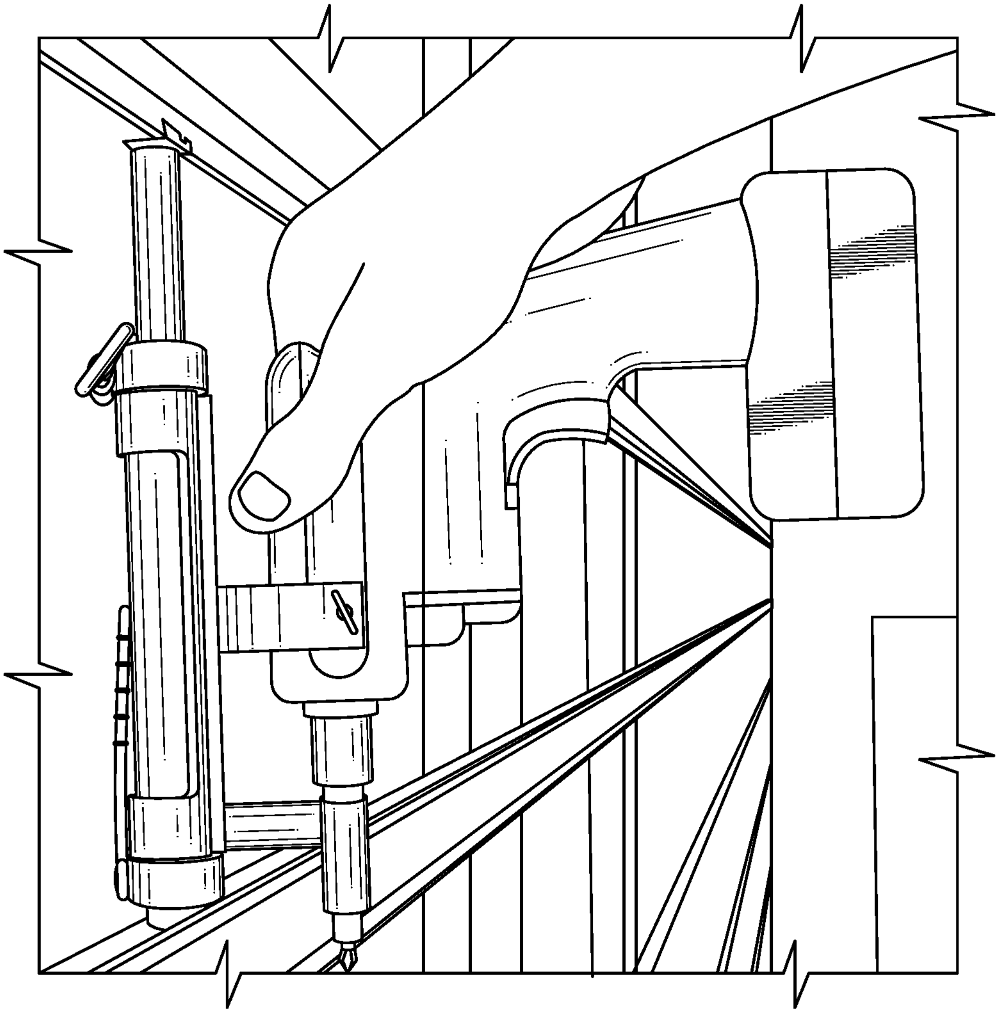
Figure 12:
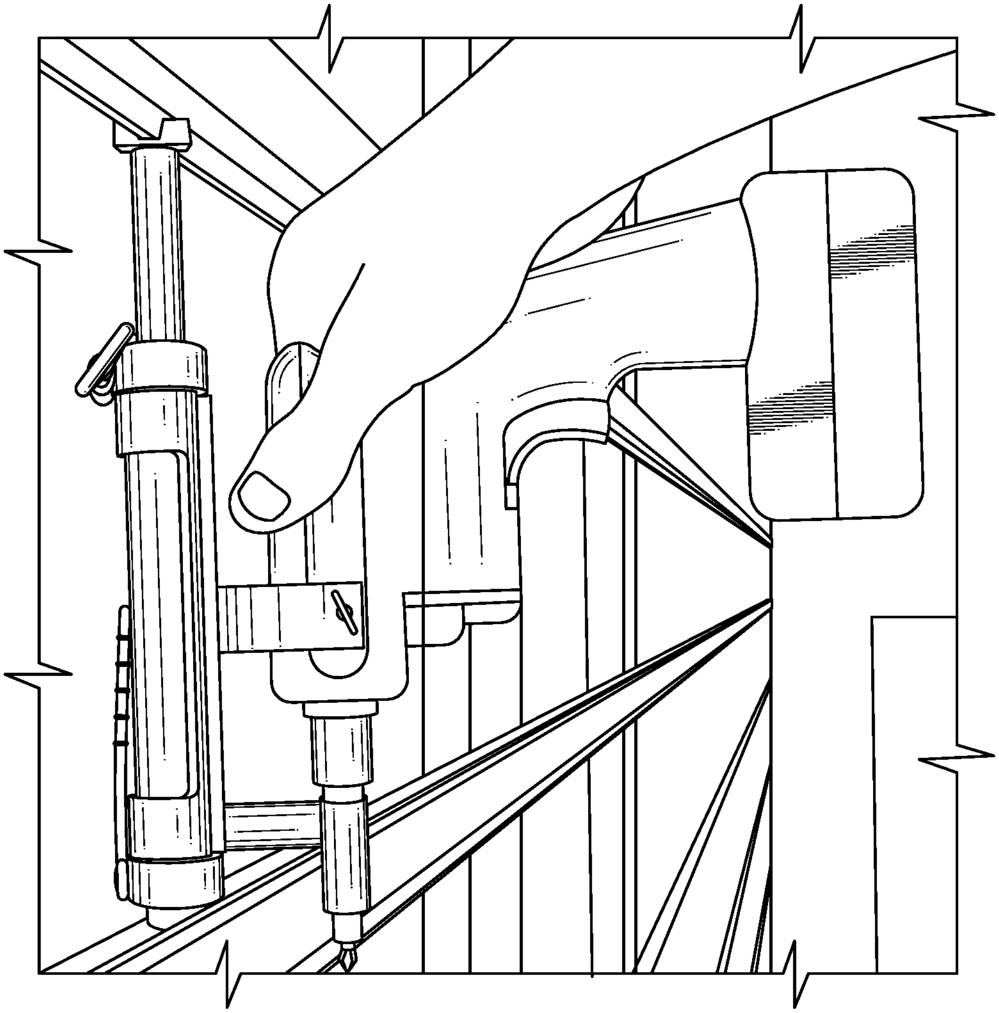

The installation device in use on a screw gun is shown in FIG. 10 in an overhead, or ceiling framing application. Here the wire finger helps establish the proper spacing between two overhead parallel framing members. FIG. 11 shows another mode, with the wire finger rotated back and engaging one framing member with the distal bumper of the gauge barrel, and with the proximal end of the slide establishing the correct spacing for another framing member. FIG. 12 shows a similar application, but with the slide rotated ninety degrees so that the framing member is engaged between the two fingers or teeth of the stop member at the proximal end of the slide.

Many modifications and variations of the spacing tool 18 of this invention are possible, beyond the embodiments presented here as examples, without departing from the scope and spirit of this invention, as defined in the appended claims.

What is claimed is:

1. A tool that mounts onto a hand-held portable power driver of the type having a body covered by a case, a grip handle at a proximal end for holding the power driver in one hand, and a rotary spindle at a distal end holding a driver bit; the tool being configured for ensuring proper and uniform spacing of framing members in a building structure during installation, comprising a support that includes an elongated bracket having a distal end and a proximal end, the bracket being removably attachable to the case of the power tool, and a clamping arrangement mounted on said bracket, the clamping arrangement comprising distal and proximal C-shaped spring clamp members disposed at the distal and proximal ends, respectively, of said bracket;

a generally round, tubular elongated gauge body adapted to snap-attach removably into place in the clamping arrangement, the gauge body having one end and another end, with an end bumper at said one end of the tubular gauge body;

a straight, generally cylindrical slide member that is slidably disposed within said tubular gauge body and can be slidably extended from the other end of said tubular gauge body, with a stop member at an end of the extended portion of said slide member, and the slide member being extendable from said gauge body for a sufficient distance such that the combined length of the tubular gauge body and the extended portion of said slide member can be set at a given length that is a proper spacing of said framing members; and a slide lock disposed at said other end of the gauge body for releasably holding said slide member such that said extended portion is lockable to set the slide member at said given length.

2. The tool according to claim 1, wherein said bracket includes a C-shaped bracket that is adapted for securing to opposite sides of said case of said power driver.

3. The tool according to claim 2, wherein said power driver case has recesses on left and right sides thereof, and said bracket has left and right thumb-screw fastener members positioned at respective ends of said C-shaped bracket that can be moved towards one another to engage said casing within the respective left and right recesses.

4. The tool according to claim 1, wherein said support includes an elongated planar member that is affixed onto said bracket, and wherein said clamping arrangement includes distal and proximal C-shaped snap-in spring clamp devices which are affixed to respective ends of said elongated planar member, and which are configured to permit said gauge body to be pushed into place and pulled out from said elongated support bracket.

5. The tool according to claim 4, wherein said support includes a strut extending downward from a distal end of said elongated planar member, and a cylindrical tubular spindle collar affixed at a lower end of said strut and adapted to fit over said spindle without interfering with rotation of said spindle.

6. The tool according to claim 1, wherein said clamping arrangement includes a pair of snap-in clamping devices mounted respectively at ends of said support bracket.

7. The tool according to claim 1, wherein said gauge body includes an elongated tube within which said slide member can travel for at least a limited distance within said generally tubular elongated gauge body; and said slide lock includes a clamp at said other end of the tubular elongated gauge body; and that is configured to permit travel of the slide member when in an open condition and to close against the slide member and block its travel when in a closed condition.

8. The tool according to claim 1, wherein the stop member on said slide member includes a right-angle piece adapted for engaging said framing member.

9. The tool according to claim 8, wherein said right angle member includes a plate piece transverse to said slide member adapted for engaging an edge of a said framing member, and having a pair of parallel teeth that project proximally-distally from an edge of said plate piece.

10. The tool according to claim 1, wherein said gauge body member includes a swing-out probe member pivotally attached to said one end thereof.

11. The tool according to claim 10, wherein said swing-out probe member is a stiff wire member pivotally mounted on a collar located said one end of said gauge body member.

12. The tool according to claim 1 wherein said gauge body has rings, of greater diameter than said C-shaped spring clamps, disposed at the proximal and distal ends, respectively, and at a spaced distance from one another corresponding to the distance between the proximal edge of one of said spring clamps to the distal edge of the other.

* * * * *